US008971325B1

(12) United States Patent
Pannell

(10) Patent No.: US 8,971,325 B1
(45) Date of Patent: Mar. 3, 2015

(54) POLICY SYSTEM AND METHOD FOR A SWITCHING DEVICE

(75) Inventor: Donald Pannell, Cupertino, CA (US)

(73) Assignee: Marvell International Ltd. (BM)

( * ) Notice: Subject to any disclaimer, the term of this patent is extended or adjusted under 35 U.S.C. 154(b) by 1573 days.

(21) Appl. No.: 11/768,622

(22) Filed: Jun. 26, 2007

Related U.S. Application Data

(60) Provisional application No. 60/818,079, filed on Jun. 30, 2006.

(51) Int. Cl.
*H04L 12/56* (2006.01)
(52) U.S. Cl.
USPC ........... 370/392; 370/230; 370/235; 370/341; 370/349; 370/351; 370/356; 370/386; 370/389; 370/395.2; 370/395.3; 370/395.53; 370/395.71; 370/398; 370/399; 370/401; 370/404; 370/412; 370/428; 370/469
(58) Field of Classification Search
None
See application file for complete search history.

(56) References Cited

U.S. PATENT DOCUMENTS

| | | | | | |
|---|---|---|---|---|---|
| 5,016,221 | A | * | 5/1991 | Hamstra | 365/221 |
| 5,313,458 | A | * | 5/1994 | Suzuki | 370/230 |
| 5,502,728 | A | * | 3/1996 | Smith, III | 714/5 |
| 5,560,038 | A | * | 9/1996 | Haddock | 709/236 |
| 5,566,178 | A | * | 10/1996 | Butter et al. | 370/452 |
| 5,654,969 | A | * | 8/1997 | Wilhelmsson | 370/460 |
| 6,104,700 | A | * | 8/2000 | Haddock et al. | 370/235 |
| 6,161,144 | A | * | 12/2000 | Michels et al. | 709/238 |
| 6,181,702 | B1 | * | 1/2001 | Egbert | 370/401 |
| 6,308,220 | B1 | * | 10/2001 | Mathur | 709/238 |
| 7,502,366 | B1 | * | 3/2009 | Erimli et al. | 370/389 |
| 7,827,402 | B2 | * | 11/2010 | Smith | 713/160 |
| 8,181,240 | B2 | * | 5/2012 | Jonnala et al. | 726/15 |
| 2002/0124107 | A1 | * | 9/2002 | Goodwin | 709/242 |
| 2002/0131411 | A1 | * | 9/2002 | Bhatia | 370/389 |
| 2003/0026267 | A1 | * | 2/2003 | Oberman et al. | 370/397 |
| 2005/0117522 | A1 | * | 6/2005 | Basavaiah et al. | 370/252 |
| 2008/0034267 | A1 | * | 2/2008 | Hou et al. | 714/752 |

* cited by examiner

*Primary Examiner* — Jae Y Lee
*Assistant Examiner* — Aixa A Guadalupe-Cruz

(57) ABSTRACT

Exemplary embodiments of a system and method enable application of policy using Layer 2 fields for a data frame, simplified data structures, or both. In accordance with one aspect of the present invention, a policy may be based upon a destination address (DA), a source address (SA), or a virtual local area network identification (VID) associated with a data frame.

16 Claims, 4 Drawing Sheets

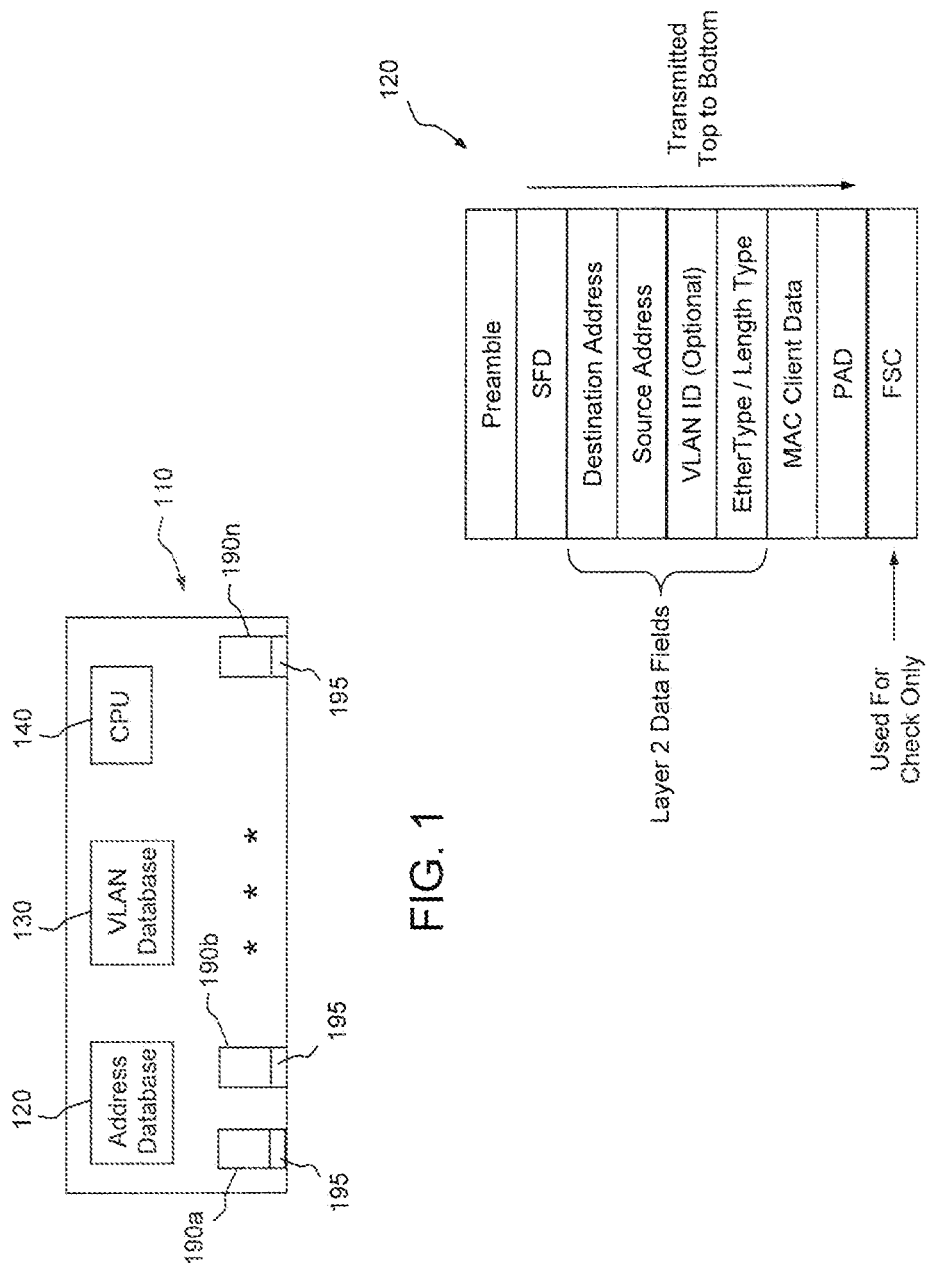

POLICY SYSTEM AND METHOD FOR A SWITCHING DEVICE

CROSS-REFERENCE TO RELATED APPLICATIONS

The present application claims the benefit of U.S. provisional application Ser. No. 60/818,079, filed Jun. 30, 2006, entitled "LAYER 2 POLICY CONTROL LISTS", the disclosure of which is incorporated herein by reference in its entirety.

BACKGROUND

1. Field of the Invention

Aspects of the present invention relate generally to data link layer switching techniques, and more particularly to a system and method enabling application of policy on a data frame using Layer 2 data fields and simplified data structures.

2. Description of Related Art

In accordance with the Open Systems Interconnection (OSI) model, a data link layer, or "Layer 2", of a protocol stack generally facilitates data transfer between physical nodes in a data network. Layer 2 may function in conjunction with various protocols such as Ethernet (the Institute of Electrical and Electronics Engineers (IEEE) 802 standard), for instance; other protocols include high-level data link control (HDLC) and advanced data communication control protocol (ADCCP).

As is generally known in conventional switching methodologies, address databases are constructed to facilitate proper routing of data frames ingressing or egressing a port at a switch. With respect to Layer 2, various data fields associated with a particular data frame are employed to ensure proper communication of the data. These data fields generally include the following: a destination address (DA) for the frame; a source address (SA) of the frame; an EtherType, sometimes referred to as a length type, characterizing the frame; and a virtual local area network (VLAN) identification (or VID). These data fields allow Layer 2 to interface the physical layer (Layer 1) and the network layer (Layer 3) to provide appropriate data transfer of properly tagged frames.

Conventional systems are deficient, however, to the extent that Layer 2 data fields are not currently used to implement policy using a simple data structure and economical switching hardware. In particular, policy functionality has traditionally failed efficiently to take advantage of the architecture (e.g., port registers and databases) that exists to support Layer 2 switching; this is true even though some policy determinations require examination of the same data fields (and cross-reference values in those data fields against the same address databases) employed by Layer 2. Accordingly, current policy strategies are characterized by very large memory requirements, and generally employ ternary content-addressable memory (TCAM) or other high-capacity data storage components. While potentially allowing sophisticated policy features, conventional solutions add complexity and cost to switching hardware.

Hence, it would be desirable to provide a method and system that decrease the memory requirements typically associated with enabling policy features while still providing flexible switching functionality.

SUMMARY

Embodiments of the present invention overcome the above-mentioned and various other shortcomings of conventional technology, providing a system and method enabling application of policy using Layer 2 fields for a data frame and simplified data structures. In accordance with one aspect of the present invention, a policy may be based upon a destination address (DA), a source address (SA), or a virtual local area network identification (VID) associated with a data frame.

The foregoing and other aspects of various embodiments of the present invention will be apparent through examination of the following detailed description thereof in conjunction with the accompanying drawing figures.

BRIEF DESCRIPTION OF THE DRAWING FIGURES

FIG. 1 is a simplified diagram illustrating an exemplary embodiment of a switch.

FIG. 2 is a simplified diagram illustrating an exemplary frame.

DETAILED DESCRIPTION

Introduction

Figure 3:
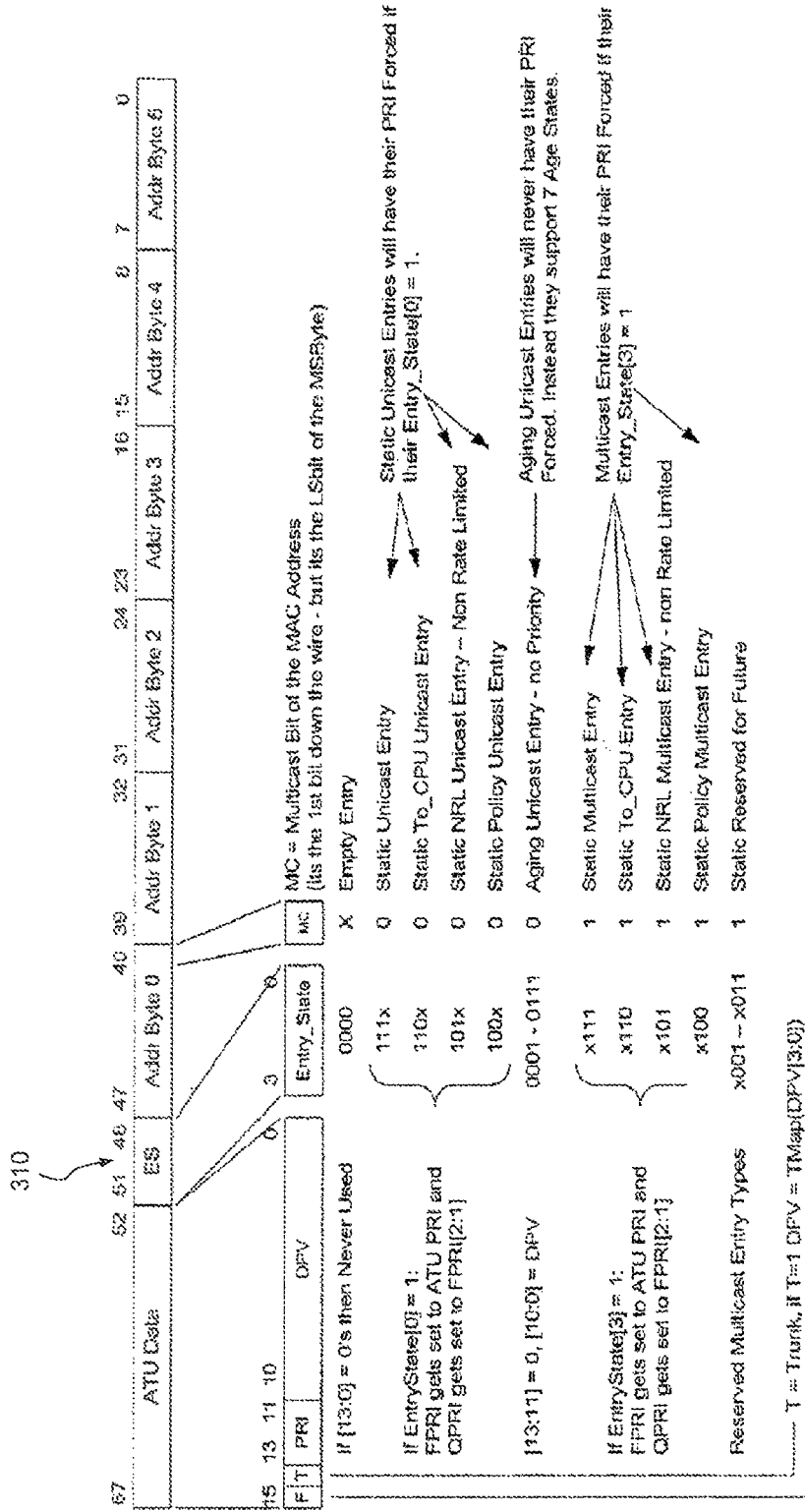
FIG. 3 is a simplified diagram illustrating one embodiment of an address translation unit (ATU) entry format for use in conjunction with Layer 2 policy control.

The term "policy" as used herein generally refers to a set of rules that enables a switch to perform a function responsive to values in data fields associated with a particular frame. In this context, exemplary policy functionality may include some or all of the following processes, without limitation: discarding a frame; trapping a frame to a central processing unit (CPU) located at the switch or elsewhere; mirroring a frame to a CPU (located at the switch or elsewhere); and allowing the frame to be transmitted through the switch normally, i.e., without any policy intervention.

FIG. 1 is a simplified diagram illustrating an exemplary embodiment of a switch. Switch 110 generally comprises an address database 120, a virtual local area network (VLAN) database 130, and a CPU 140. Address database 120 and VLAN database 130 may maintain data records regarding IEEE 802.3 media access controller (MAC) addresses and 802.1Q VLAN membership characteristics of networked computers or other devices in bi-directional data communication with switch 110 at ports 190a-190n. Accordingly, each port may have independent access to data records stored in address database 120 and VLAN database 130. Additionally, each port generally includes one or more programmable registers 195 that may influence the manner in which a particular port transmits or otherwise manipulates a frame of data. CPU 140 may facilitate switching functionality of switch 110 in conjunction with the other components illustrated in FIG. 1 as is generally known in the art.

In accordance with one aspect of the invention, policy may be performed using values of data fields available to switch 110 at the data link layer (Layer 2) of the OSI model. In that regard, FIG. 2 is a simplified diagram illustrating an exemplary IEEE 802.3 frame. A frame 120 may comprise various data fields that influence the manner in which the frame may be transmitted, processed, or otherwise manipulated. Layer 2 processing operations may generally employ the following fields associated with a given data frame: destination address (DA); source address (SA); EtherType or length type; and optional VLAN identification (VID). The preamble, the start-of-frame delimiter (SFD), the MAC client data, an optional padding of the frame to meet minimum frame size requirements (PAD), and the frame sequence check (FSC) data fields are generally not relevant to Layer 2 processing. The FSC data field is generally employed to ascertain whether, for example, a frame includes erroneous data or is otherwise corrupted; in this case, the frame may be discarded or filtered, but the FSC data field does not otherwise affect Layer 2 switching operations.

As set forth in more detail below, the ability to perform policy control operations using Layer 2 data fields (such as DA, SA, or VID for example, either individually or in combination) without requiring an independent (and typically expensive) memory table may minimize or eliminate redundancies and provide useful switching functionality or options. Additionally, a Layer 2 policy strategy such as described herein may afford a robust defense against denial of service (DoS) attacks in some situations. In accordance with one exemplary embodiment, address database 120 may be modified to exploit untapped resources and to realize efficiencies that have traditionally been ignored; by defining some previously unused Entry_State values, or by adding an Entry_State record, address database 120 itself may be implemented to indicate a Policy Enable with respect to a given MAC address. In conjunction with policy control register settings at each of ports 190a-190n, a particular port may execute a particular operation in accordance with the Policy Enable and the settings of registers 195.

In the foregoing manner, traps, mirrors, or discards may be implemented on all the ingress data on a port, all the egress data on a port, or both. To help isolate DoS attacks and to facilitate billing or other accounting techniques, for example, monitoring frames to a specific DA, from a specific SA, or both, may be desirable. By way of example, once a DoS attack has been identified, all frames from a particular SA (which has been determined as the source of the DoS attack) may be appropriately trapped or discarded.

As set forth in more detail below, additional data associated with a frame may be employed by registers 195 at each of ports 190a-190n, for example, to enable flexible policy control functionality without requiring high-capacity memory components.

Exemplary Implementations

With respect to performing policy control operations based on frame DA, SA, or VID data, aspects of the present invention may employ an address translation unit (ATU) and a VLAN translation unit (VTU). For example, an ATU is an address database 120 such as described above with reference to FIG. 1; such an address database may be employed to facilitate proper transmission of data frames. In this context, a VTU is a VLAN database 130 such as described above. A VTU generally stores VID information and port membership information. Since these databases are generally maintained to enable proper switching of data, a system and method of policy using Layer 2 data fields employ data that are readily accessible. ATU, VTU, or both, may be shared by each port 190a-190n on switch 110, i.e., each port may access the information in the ATU and the VTU, minimizing redundancy and overall memory requirements.

Figure 4:
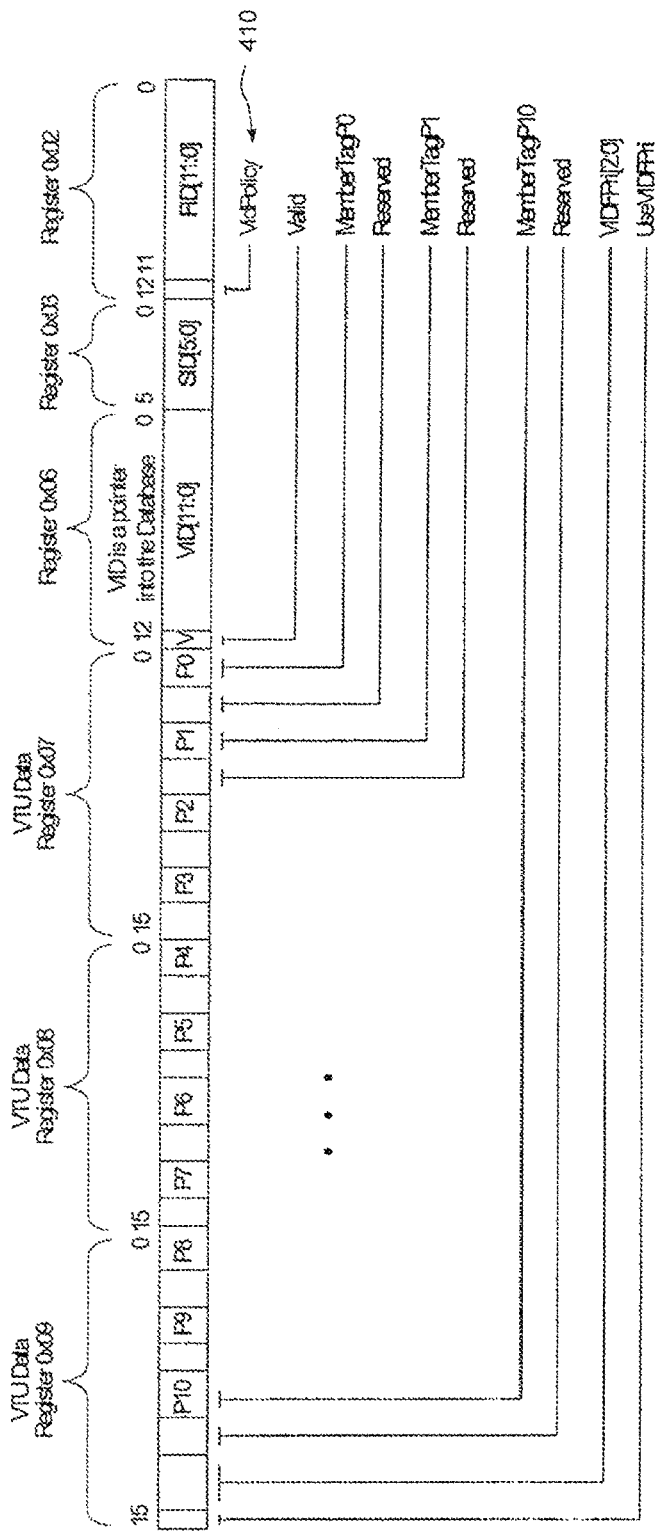
FIG. 4 is a simplified diagram illustrating one embodiment of a virtual local area network translation unit (VTU) entry format for use in conjunction with Layer 2 policy control.

FIG. 3 is a simplified diagram illustrating one embodiment of an ATU entry format for use in conjunction with Layer 2 policy control, and FIG. 4 is a simplified diagram illustrating one embodiment of a VTU entry format for use in conjunction with Layer 2 policy control.

As indicated in FIG. 3, an ATU entry may be flagged as a "Policy" entry by an appropriate value in the Entry_State field (reference numeral 310). In FIG. 3, a value of Entry_State=100X flags a policy unicast entry, whereas as value of Entry_State=X100 flags a policy multicast entry. Policy entries, in conjunction with register 195 settings at ports 190a-190n, may instruct switch 110, on a per-port basis: to mirror a frame to a particular destination (MirrorDest); to trap a frame to a particular destination (TrapDest); or to discard a frame (see, e.g., Table I). This feature may be expanded to include a VTU policy entry, for example, by defining one bit per entry in the VTU to be a VidPolicy bit (reference numeral 410 in FIG. 4). It will be appreciated that a single bit per VID may define that VID as a policy VID; accordingly, modification (e.g., including a single bit per table entry) to accommodate policy functionality does not significantly increase the overall size of the VTU.

The ATU and VTU entries are simply flagged as policy, while the register settings at the ports determine how to respond if a particular entry is policy. Flagging database entries as policy, either by taking advantage of unused fields that are already in the database or by adding one bit (or even a few bits) per entry, does not add a significant amount of memory beyond what the databases already require. With this architecture, substantial reduction in overall memory requirements may be achieved, since a large database defining every possible policy action for every port (with respect to every data field and every address entry) is not needed, nor is a large TCAM needed. Additionally, processing cycle time attendant with accessing such a complex data structure is reduced.

Mirrored frames may be duplicated, such that a copy of the frame may be transmitted to CPU 140 for inspection or other processing; additionally or alternatively, the frame may be transmitted to a different CPU, for example, that may be external to switch 110. Trapped frames may be transmitted exclusively to a CPU, i.e., irrespective of the DA, the switch may prevent transmission to that DA, and rather forward the frame to a CPU for processing. A discarded frame may be dropped entirely, i.e., it is not sent to any destination, but rather is ignored. In accordance with "normal" switching, a frame is transmitted by switch 110 with none of the foregoing policy operations interfering with or otherwise affecting the frame or its destination.

Per-port enables for DA-based, SA-based, VID-based (or some combination thereof) mirroring, including the option to discard or to trap, are generally referred to as DA Policy, SA Policy, and VID Policy. These policy enables, and others described below, for example, may be defined in a policy control register specification such as illustrated in Table I. The ATU Policy Entry_State values may be defined in an ATU data register specification such as illustrated in Table II and in the entry format illustrated in FIG. 3. The foregoing register specifications may be employed by each register 195 at each of ports 190a-190n. The VTU Policy bit is indicated at reference numeral 410 in the entry format illustrated in FIG. 4.

In operation, a port 190a-190n receiving a data frame may consult the policy control register upon ascertaining the Entry_State values (from the ATU entry and the data register) for the DA and SA, upon ascertaining the value of the VidPolicy bit (from the VTU database) for the VID, or both. The switch may subsequently copy (i.e., mirror), trap (i.e., redirect), or filter (i.e., discard) the frame, depending upon one or more of the DA, SA, or VID associated with the frame as indicated at the first three entries in Table I. Additionally, it will be appreciated that the Entry_State values of the DA and SA, as well as the value of the VidPolicy bit, may indicate that the frame is to be switched normally, without mirroring, trapping, or discarding; this feature is also indicated in Table I.

Once a MAC address has been flagged as "Policy", i.e., susceptible of policy actions, switch 110 may perform policy control functionality on any port 190a-190n where policy control is enabled (in accordance with settings at register 195). Additionally or alternatively, a per-port bit may be added to the ATU so as to enable selection of a particular port (or ports) with respect to which a particular MAC address can implement policy control. For SA mappings, this feature is readily supported, since the source port's bit must be set in the MAC entry's destination port vector (DPV) field (which is really the source information on SA's) before policy can be implemented on that port (i.e., the SA is associated with the source port for the frame). This feature generally cannot be implemented in the same way for the DA data field, but DA policy is typically executed in situations where it is not necessary to identify a source port. For example, to identify all users making requests to a particular server or network node (e.g., service of an ISP), it may be required that each individual user making such a request be identified using SA data; on the other hand, to identify simply the number of requests to a particular server (i.e., irrespective of the identity of the source of the request), it may only be necessary to monitor DA data.

With respect to VID-based policy control, it will be appreciated that if VID policy is executed at a particular ingress port, that port should be a member of the VLAN associated with the VID. If the port is not a member of the VLAN, then the frame may be discarded due to VLAN membership rules, ensuring that VID-based policy features are only implemented with respect to a VID when the port is a member of the VLAN associated with the VID. The foregoing strategy makes use of existing bits in the VID to control where such policy control occurs.

With respect to adding policy control on a PortEType register entry, it will be appreciated that some switch ports may have a PortEType register that is not used when the frame mode for a particular port is set to Normal Network; i.e., if the port is not expecting a specific EtherType frame based upon the frame mode, the register is not used. Typically, a dedicated PortEType register for each port uses an independent value such that each port may be configured independently. When a particular port is configured to operate in Provider mode, the PortEType register for that port is set in accordance with the frame's Provider EtherType (i.e., the PortEType is set to match the EtherType that a provider uses on its provider VLAN double-tagged frames). This register may also be used to detect EtherType distributed switching architecture (DSA) tagged frames when the port is configured in EtherType DSA mode; this EtherType DSA technology is proprietary to the assignee of the present disclosure.

As noted above, when a particular port is operating in Normal mode, the PortEType register is unused (since the port is not expecting a specific EtherType frame) and available to enable policy features (such as mirror, trap, and discard) with respect to frames of any EtherType that may be currently in use or developed in the future.

In that regard, the PortEType register may be set to examine an EtherType field for a frame even when the frame mode is Normal. In the foregoing manner, a per-port register may readily be programmed to enable trapping when a frame EtherType matches a port PortEType register when the port is operating in Normal mode; additionally or alternatively, a per-port register may be programmed to enable mirroring when a frame EtherType matches a port PortEType register when the port is in Normal mode. Where each per-port register is two bits, the foregoing functionality may be expanded to support discarding PortEType frames. This feature is illustrated at the "EType Policy" entry in Table I.

With respect to adding policy control for virtual broadband access server (VBAS) frames and point-to-point protocol over Ethernet (PPPoE) frames, it may be desirable in certain instances to trap these specific frame types to a CPU. An exemplary solution may employ hard-wired 16-bit compares that do not require addition of an expensive TCAM or other memory component. It will be appreciated that a VBAS frame is defined as a frame with an EtherType=0x8200, and that a PPPoE frame is a frame with an EtherType=0x8863. While policy may be implemented on these frames according to settings in the PortEType register as set forth above, dedicated registers may be incorporated easily into the switch.

A per-port register may enable trapping VBAS frames; additionally or alternatively, a per-port register may enable trapping PPPoE frames. This functionality may be expanded to support mirroring and/or discarding VBAS and PPPoE frames by adding two bits per port per option. As indicated at the "VBAS Policy" and "PPPoE Policy" entries in Table I, exemplary switching hardware may include these 2-bit per port per option registers.

Though the following policy features do not specifically employ Layer 2 data fields, they enable useful policy control through simple 2-bit register settings. Accordingly, as with the foregoing Layer 2 policy schemes, these techniques do not rely upon high-capacity TCAM storage and complicated data structures for effective policy implementation.

With respect to adding policy control for dynamic host control protocol (DHCP) option 82, it will be appreciated that DHCP option 82 is used whenever a computer or other networked component makes a request for an IP address. Such a request must generally be transmitted exclusively to a DHCP server operated by a specific provider, i.e., the request should not go to a competing provider's or another customer's DHCP server, for instance. In one embodiment, DHCP option 82 is defined to be an Internet Protocol version 4 (IPv4) frame with Protocol=17 (decimal), or 0x11. The frame has a user datagram protocol (UDP) Destination Port=67 (decimal) or 0x0043 for a server, and a UDP Destination Port=68 (decimal) or 0x0044 for a client.

Since the DHCP option 82 is well defined, adding a policy control function in hardware requires very few gates, and saves the need for an expensive TCAM or other data storage component. In accordance with some embodiments, a switch may readily be modified to include a per-port register to enable trapping DHCP option 82 frames to a CPU. Additionally, where each per-port register is two bits, policy features may support mirroring, discarding, or both. Further, policy may be implemented on generic UDP Policy frames for current or future protocols. In some implementations, two bits are required for Server/Client DHCP Option 82, and two bits are required for Broadcast IPv4 UDP's and Multicast IPv6 UDP's.

As indicated at the "Opt82 Policy" and "UDP Policy" entries in Table I, an exemplary embodiment of a switch may devote registers totaling four bits per port to support the foregoing features.

The foregoing functionality will be better appreciated through examination of Tables I and II set forth below, taken in conjunction with FIGS. 1-4.

TABLE I

Policy Control Register

| # of Bits | Field | Type | Description |
|---|---|---|---|
| 2 | DA Policy | RWR | DA Policy Mapping. When these bits are cleared to a zero, normal frame switching occurs. When either or both of these bits are set to a one, then DA Policy Mapping can occur on this port. DA Policy Mapping occurs when the DA of a frame is contained in the ATU address database with an Entry_State that indicates Policy. When this occurs, the mapping of non-filtered frames is determined by the setting of these bits as follows:<br>00 = Normal frame switching<br>01 = Mirror (copy) frame to the MirrorDest port<br>10 = Trap (re-direct) frame to the CPUDest port<br>11 = Discard (filter) the frame<br>Mirrored frames that egress a DSA or EtherType DSA port will egress as a To_CPU frame with a Code of Policy Monitor.<br>Trapped frames that egress a DSA or EtherType DSA port will egress as a To_CPU frame with a Code of Policy Trap. |
| 2 | SA Policy | RWR | SA Policy Mapping. When these bits are cleared to a zero, normal frame switching occurs. When either or both of these bits are set to a one, then SA Policy Mapping can occur on this port. SA Policy Mapping occurs when the SA of a frame is contained in the ATU address database with an Entry State that indicates Policy. When this occurs, the mapping of non-filtered frames is determined by the setting of these bits as follows:<br>00 = Normal frame switching<br>01 = Mirror (copy) frame to the MirrorDest port<br>10 = Trap (re-direct) frame to the CPUDest port<br>11 = Discard (filter) the frame<br>Mirrored frames that egress a DSA or EtherType DSA port will egress as a To_CPU frame with a Code of Policy Monitor.<br>Trapped frames that egress a DSA or EtherType DSA port will egress as a To_CPU frame with a Code of Policy Trap. |
| 2 | VTU Policy | RWR | VTU Policy Mapping. When these bits are cleared to a zero, normal frame switching occurs. When either or both of these bits are set to a one, then VTU Policy Mapping can occur on this port. VTU Policy Mapping occurs when the VID of a frame is contained in the VTU database with the VidPolicybit set to a one. When this occurs, the mapping of non-filtered frames is determined by the setting of these bits as follows:<br>00 = Normal frame switching<br>01 = Mirror (copy) frame to the MirrorDest port<br>10 = Trap (re-direct) frame to the CPUDest port<br>11 = Discard (filter) the frame<br>Mirrored frames that egress a DSA or EtherType DSA port will egress as a To_CPU frame with a Code of Policy Monitor.<br>Trapped frames that egress a DSA or EtherType DSA port will egress as a To_CPU frame with a Code of Policy Trap. |
| 2 | EType Policy | RWR | EType Policy Mapping. When these bits are cleared to a zero, normal frame switching occurs. When either or both of these bits are set to a one, then EType Policy Mapping can occur on this port if the port's FrameMode is Normal Network. EType Policy Mapping occurs when the EtherType of a frame matches the PortEType register. When this occurs, the mapping of non-filtered frames is determined by the setting of these bits as follows:<br>00 = Normal frame switching<br>01 = Mirror (copy) frame to the MirrorDest port<br>10 = Trap (re-direct) frame to the CPUDest port<br>11 = Discard (filter) the frame<br>Mirrored frames that egress a DSA or EtherType DSA port will egress as a To_CPU frame with a Code of Policy Monitor.<br>Trapped frames that egress a DSA or EtherType DSA port will egress as a To_CPU frame with a Code of Policy Trap. |
| 2 | PPPoE Policy | RWR | PPPoE Policy Mapping. When these bits are cleared to zero, normal frame switching occurs. When either or both of these bits are set to a one, then PPPoE Policy Mapping can occur on this port. PPPoE policy mapping occurs when the EtherType of a frame matches 0x8863. When this occurs, the mapping of non-filtered frames is determined by the setting of these bits as follows:<br>00 = Normal frame switching<br>01 = Mirror (copy) frame to the MirrorDest port<br>10 = Trap (re-direct) frame to the CPUDest port<br>11 = Discard (filter) the frame<br>Mirrored frames that egress a DSA or EtherType DSA port will egress as a To_CPU frame with a Code of Policy Monitor.<br>Trapped frames that egress a DSA or EtherType DSA port will egress as a To_CPU frame with a Code of Policy Trap. |
| 2 | VBAS Policy | RWR | VBAS Policy Mapping. When these bits are cleared to a zero, normal frame switching occurs. When either or both of these bits are set to a one, then VBAS Policy Mapping can occur on this port. VBAS Policy Mapping occurs when the EtherType of a frame matches 0x8200. When this occurs, the mapping of non-filtered frames is determined by the setting of these bits as follows: |

TABLE I-continued

Policy Control Register

| # of Bits | Field | Type | Description |
|---|---|---|---|
| | | | 00 = Normal frame switching |
| | | | 01 = Mirror (copy) frame to the MirrorDest port |
| | | | 10 = Trap (re-direct) frame to the CPUDest port |
| | | | 11 = Discard (filter) the frame |
| | | | Mirrored frames that egress a DSA or EtherType DSA port will egress as a To_CPU frame with a Code of Policy Monitor. |
| | | | Trapped frames that egress a DSA or EtherType DSA port will egress as a To_CPU frame with a Code of Policy Trap. |
| 2 | Opt82 Policy | RWR | DHCP Option 82 Policy Mapping. When these bits are cleared to a zero, normal frame switching occurs. When either or both of these bits are set to a one, then DHCP Option 82 Policy Mapping can occur on this port. DHCP option 82 Policy Mapping occurs when the ingressing frame is an IPv4 UDP with a UDP Destination port = 0x0043 (or decimal 67) or 0x0044 (or decimal 68) or an IPv6 UDP with a UDP Destination port = 0x0223 or 0x0222. When this occurs, the mapping of non-filtered frames is determined by the setting of these bits as follows: |
| | | | 00 = Normal frame switching |
| | | | 01 = Mirror (copy) frame to the MirrorDest port |
| | | | 10 = Trap (re-direct) frame to the CPUDest port |
| | | | 11 = Discard (filter) the frame |
| | | | Mirrored frames that egress a DSA or EtherType DSA port will egress as a To_CPU frame with a Code of Policy Monitor. |
| | | | Trapped frames that egress a DSA or EtherType DSA port will egress as a To_CPU frame with a Code of Policy Trap. |
| 2 | UDP Policy | RWR | UDP Policy Mapping. When these bits are cleared to a zero, normal frame switching occurs. When either or both of these bits are set to a one, then UDP Policy Mapping can occur on this port. UDP Policy Mapping occurs when the ingressing frame is a Broadcast IPv4 UDP or a Multicast IPv6 UDP. When this occurs, the mapping of non-filtered frames is determined by the setting of these bits as follows: |
| | | | 00 = Normal frame switching |
| | | | 01 = Mirror (copy) frame to the MirrorDest port |
| | | | 10 = Trap (re-direct) frame to the CPUpDest port |
| | | | 11 = Discard (filter) the frame |
| | | | Mirrored frames that egress a DSA or EtherType DSA port will egress as a To_CPU frame with a Code of Policy Monitor. |
| | | | Trapped frames that egress a DSA or EtherType DSA port will egress as a To_CPU frame with a Code of Policy Trap. |

TABLE II

ATU Data Register

| # of Bits | Field | Type | Description |
|---|---|---|---|
| 1 [15] | Trunk | RWR | Trunk Mapped Address. When this bit is set to a one, the data in bits 7:4 below (PortVec bits [3:0]) are the Trunk ID assigned to this address. PortVec bits [10:4] must be written as zero when this bit is set to a one. When this bit is cleared to a zero, the data in bits 14:4 below (PortVec bits [10:0]) are the port vector assigned to this address. |
| 12 [14:4] | PortVec/ ToPort & FromPort | RWR | Port Vector. These bits are used as the input Port Vector for ATU Load operations and indicate the resulting Port Vector from ATU Get Next operations. The lower four bits [7:4] are used as the FromPort, and the next higher four bits [11:8] are used as the ToPort during Move operations. If the ToPort = 0xF, the operation becomes a Remove Port, i.e., the FromPort is removed from the database and the entry is purged if the resulting PortVec equals zeros. |
| 4 [3:0] | EntryState/ SPID | RWR | ATU Entry_State. These bits are used as the input Entry_State for ATU Load/Purge or Flush/Move operations and indicate the resulting Entry_State from ATU Get Next operations. If these bits equal 0x0, then the ATUOp will be a Purge or a Flush. If these bits are not 0x0, then the ATUOp will be a Load or a Move (a Move ATUOp requires these bits to be 0xF). On Get/Clear Violation Data ATUOps, these bits return the Source Port ID (SPID) associated with the ATU violation that was just serviced, except for Age Out violation where these bits return 0x0. If SPID = 0xF the source of the violation was the CPU's register interface (i.e., the ATU was full during a CPU Load operation. |

Figure 5:
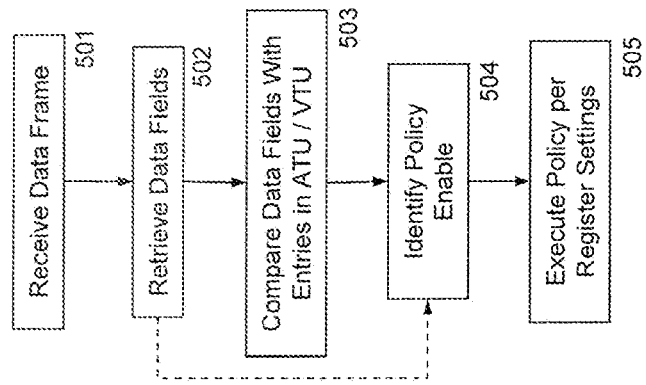
FIG. 5 is a simplified flow diagram illustrating exemplary operation of one embodiment of a method implementing policy with respect to a data frame.

With reference to Table II and FIG. 3, and by way of example only, ATU Entry_State bits on Unicast ATU entries may be defined as follows:

0x0: Unused entry
0x1 to 0x7: Used entry (denotes the age of the entry; 0x1 is the oldest)
0x8: Static Policy entry
0x9: Static Policy entry with Priority Override
0xA: Static Non Rate Limiting (NRL) entry
0xB: Static Non Rate Limiting (NRL) entry with Priority Override
0xC: Static entry defining frames with this DA as MGMT
0xD: Static entry defining frames with this DA as MGMT with Priority Override
0xE: Static entry
0xF: Static entry with Priority Override ATU Entry_State bits on Multicast ATU entries may be defined as follows:

0x0: Unused entry
0x1 to 0x3: Reserved for future use
0x4: Static Policy entry
0x5: Static Non Rate Limiting (NRL) entry
0x6: Static entry defining frames with this DA as MGMT
0x7: Static entry
0xC: Static Policy entry with Priority Override
0xD: Static Non Rate Limiting (NRL) entry with Priority Override
0xE: Static entry defining frames with this DA as MGMT with Priority Override
0xF: Static entry with Priority Override FIG. 5 is a simplified flow diagram illustrating exemplary operation of one embodiment of a method implementing policy with respect to a data frame. As indicated at block 501, the method may generally begin with receiving a data frame at a port of a switch; this port is referred to as an ingress port when receiving the data frame and as an egress port when transmitting the data frame out of the switch. Data fields associated with the frame may be retrieved or extracted as indicated at block 502. For Layer 2 switching, these retrieved data fields may be DA, SA, EtherType, and VID; additionally or alternatively, data fields identifying a frame as a VBAS, PPPoE, or UDP frame may be retrieved.

DA, SA, and VID data fields may be compared with records in a database, such as the ATU or VTU, as indicated at block 503. A policy enable (such as a flag, for instance) associated with the data field may be identified at block 504. Data records flagged as policy entries apprise the port that policy is, or may be, required on the frame. As an alternative, where registers at the port are appropriately programmed as set forth above, certain data fields may enable policy features without requiring access to a database. For example, the PortEType register may be set to examine a frame's Ether-Type (which does not require database access) to enable policy functions; additionally or alternatively, identification of VBAS, PPPoE, and UDP frames does not require use of the database. In these instances, the port is hard-wired, or a register is appropriately programmed, such that identification of a policy enable is automatic upon the determination of a particular value in a data field. This feature is represented by the dashed arrow bypassing block 503 in FIG. 5.

A policy function may then be executed with respect to the data frame responsive to the policy enable and in accordance with register settings at a port as indicated at block 505. As set forth above, the policy function to be performed is determined by settings at the registers of the port. This strategy eliminates the need for complicated data structures assigning certain policy functions per data field per port, and minimizes processing overhead associated with traversing such a complicated data structure for every frame. Policy is indicated by a flag on a data field, while the port's response to a given policy determination is governed by register settings. In some embodiments in which a database need not be consulted for the policy enable, the policy function to be performed may be determined exclusively by settings at the registers of the port.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
    retrieving a data field of a data frame at a port of a switching device, wherein the port includes at least one programmable register having register settings;
    the register settings being set with at least one predetermined value;
    determining that the retrieved data field matches the at least one predetermined value set in the at least one programmable register,
    wherein, when the data field matches the at least one predetermined value, a policy is enabled on a per port basis without requiring access to a database; and
    instructing the switching device to perform a function on the data frame based, at least in part, on the enabled policy determined by the register settings of the port.

2. The method of claim 1, further comprising selectively programming the register settings at the port.

3. The method of claim 1, wherein the function comprises mirroring the data frame to a central processing unit.

4. The method of claim 1, wherein the function comprises trapping the data frame to a central processing unit.

5. The method of claim 1, wherein the function comprises discarding the data frame.

6. The method of claim 1, wherein the data field is a Level 2 data field.

7. A non-transitory computer-readable medium storing computer-executable instructions that when executed by a computer cause the computer to perform a method, the method comprising:
    retrieving a data field associated with a data frame at a port of a switching device, wherein the port includes at least one programmable register having register settings being set with at least one predetermined value;
    comparing the retrieved data field with the at least one predetermined value set in the at least one programmable register;
    responsive to said comparing, enabling a policy on a per port basis without requiring access to a database when the data filed matches the at least one predetermined value; and
    instructing the switching device to perform a function on the data frame based, at least in part, on the enabled policy determined by the register settings of the port.

8. The non-transitory computer-readable medium of claim 7, further comprising selectively programming the register settings at the port.

9. The non-transitory computer-readable medium of claim 7, wherein the function to be performed on the data frame is implemented on ingress data or egress data on the port.

10. The non-transitory computer-readable medium of claim 7, further comprising:
- identifying a denial of service attack as originating from a source address using the data field of the data frame, wherein the data field is a source address data field and the source address is stored in the source address data field; and
- discarding data frames having the source address stored in source address fields of the data frames.

11. The non-transitory computer-readable medium of claim 7, wherein the data field is a Level 2 data field.

12. A non-transitory computer-readable medium storing computer-executable instructions that when executed by a computer cause the computer to perform a method, the method comprising:
- setting register settings of a port of a switching device to a value;
- retrieving a data field associated with a data frame at the port of the switching device;
- enabling a policy on a per port basis, without requiring access to a database, when the data field matches the value; and
- instructing the switching device to perform a function on the data frame based, at least in part, on the enabled policy identified by the register settings of the port.

13. The non-transitory computer-readable medium of claim 12, wherein the port includes at least one programmable register having the register settings.

14. The non-transitory computer-readable medium of claim 13, further comprising: selectively programming the register settings at the port.

15. The non-transitory computer-readable medium of claim 12, further comprising:
- identifying a denial of service attack as originating from a source address using the data field of the data frame, wherein the data field is a source address data field and the source address is stored in the source address data field; and
- discarding data frames having the source address stored in source address fields of the data frames.

16. The non-transitory computer-readable medium of claim 12, wherein the data field is a Level 2 data field.

* * * * *